(12) United States Patent
Günther et al.

(10) Patent No.: US 8,137,097 B2
(45) Date of Patent: Mar. 20, 2012

(54) CONNECTION DEVICE FOR A HOT RUNNER NOZZLE

(75) Inventors: Herbert Günther, Allendorf (DE); Siegrid Sommer, Burgwald (DE); Frédéric Zimmermann, Frankenberg (DE)

(73) Assignee: GÜNTHER Heisskanaltechnik GmbH, Frankenberg (DE)

( * ) Notice: Subject to any disclaimer, the term of this patent is extended or adjusted under 35 U.S.C. 154(b) by 0 days.

(21) Appl. No.: 12/739,439

(22) PCT Filed: Sep. 25, 2008

(86) PCT No.: PCT/EP2008/008115
§ 371 (c)(1),
(2), (4) Date: Apr. 23, 2010

(87) PCT Pub. No.: WO2009/052918
PCT Pub. Date: Apr. 30, 2009

(65) Prior Publication Data
US 2010/0310706 A1    Dec. 9, 2010

(30) Foreign Application Priority Data
Oct. 25, 2007   (DE) .................... 20 2007 014 964 U

(51) Int. Cl.
*B29C 45/22*    (2006.01)
(52) U.S. Cl. .................................. 425/549; 264/328.15
(58) Field of Classification Search .................. 425/549; 264/328.15
See application file for complete search history.

(56) References Cited

U.S. PATENT DOCUMENTS

| 4,156,127 | A |   | 5/1979  | Sako et al. |
|-----------|---|---|---------|-------------|
| 5,235,737 | A | * | 8/1993  | Gellert ............................ 29/611 |
| 5,266,023 | A | * | 11/1993 | Renwick ....................... 425/549 |
| 5,421,716 | A | * | 6/1995  | Gellert ........................... 425/549 |
| 5,614,233 | A | * | 3/1997  | Gellert ........................... 425/549 |
| 6,530,776 | B1 |  | 3/2003 | Pilavdzic et al. |
| 7,241,131 | B1 |  | 7/2007 | Booth et al. |
| 2003/0218006 | A1 | | 11/2003 | Sutorius |
| 2005/0109767 | A1 | | 5/2005 | Fennewald et al. |
| 2007/0086759 | A1 | | 4/2007 | Russegger et al. |

FOREIGN PATENT DOCUMENTS

| DE | 3214884 | 11/1982 |
| DE | 10333206 | 4/2004 |
| DE | 10252389 | 5/2004 |
| DE | 10319215 | 11/2004 |
| DE | 10355043 | 6/2005 |
| WO | 03/078123 | 9/2003 |
| WO | 2004/043672 | 5/2004 |
| WO | 2005/053361 | 6/2005 |

\* cited by examiner

*Primary Examiner* — Timothy Heitbrink
(74) *Attorney, Agent, or Firm* — Clark & Brody

(57) ABSTRACT

A connection system (36) implementing an electric junction between a heater (22), in particular a heater (22) for a hot runner nozzle (10) and at least one hookup conductor (32) linked to a power source, comprises a hookup body (38, 60, 70) which is made of an electrically non-conducting material and which is fitted with at least one passage (46) to receive at least one hookup conductor (32). Said passage (46) is specified to end in a side face (40) of the hookup body (38, 609, 70). Also the hookup conductor (38, 60, 70) is affixable to and/or on the substrate in a manner that in the specified state, the hookup conductors (32) passing through the minimum of one passage (46) shall make contact by their free ends with the heater (22).

18 Claims, 6 Drawing Sheets

CONNECTION DEVICE FOR A HOT RUNNER NOZZLE

The present invention relates to a connection system implementing an electric junction between a heater, in particular an injection molding nozzle heater on one hand and on the other hand a hookup conductor linked to an electric power source. Moreover the present invention relates both to a hot runner nozzle fitted with such a connection system and to said electric junction.

BACKGROUND OF THE INVENTION

Injection molding nozzles are widely known in the state of the art. They are used to feed a flowable material such as a plastic melt at a predeterminable temperature and under high pressure to a separable mold insert. In general they comprise a feed pipe fitted with a flow duct terminating in a nozzle orifice. This orifice subtends a discharge aperture issuing through a gate into the mold insert (mold nest). To preclude the flowable material within the feed pipe from cooling prematurely, one or more electric heaters assure(s) a best possible temperature distribution as far as into the nozzle orifice.

The German patent document DE-A-199 41 038 proposes depositing in bonding manner at least one insulating layer and at least one heating stratum by means of direct coating on at least one wall of a feed pipe fitted with a flow duct. Accordingly the heater and the feed pipe are designed integrally, as a result of which the insulating layer of an electrically insulating feed pipe may be eliminated. Illustratively direct coating is carried out using the foil, thick film or screen techniques, such layers being separately or simultaneously baked following their deposition. Depositing the layers in bonding manner accordingly assures a permanent firm affixation to the feed pipe wall and accordingly rigid retention on the hot runner manifold or the hot runner nozzle. Because of the compactness/thinness attained by direct deposition, the heater in turn is very compact, indeed such a design offers extreme compactness. Due to the integral design, the output can be raised considerably because the heating is directly generated and dissipated at the surface of the hot runner element requiring heating. As a result, the heaters, which typically are delicate, are reliably protected against overheating. Again, the nozzle may be heated and cooled rapidly and accurately, this feature being advantageous from the beginning to the end of the production procedure.

An electric junction between the electrical heating tracks and a power source must be created to apply electric power to such a heater. Basically such an electrical junction must meet the following requirements: on one hand it must implement electric contact between the heater and a hookup conductor linked to the electric power source. On the other hand it must be temperature resistant in the light of the high temperatures of injection molding. Also it must withstand mechanical tensile loads and assure inward and outward electrical insulation. Lastly it should be as compact as practical to miniaturize the injection molding nozzle. The last cited requirement is significant indeed for thick film heaters disclosed in the German patent document DE-A-199 41 038.

SUMMARY OF THE INVENTION

One of the objectives of the present invention is to create a connection system implementing an electric junction between a heater, in particular a thick film heater for an injection molding nozzle, where said heater is mounted on a substrate, and a hookup source connected to an electric power source and at least partly meeting the aforementioned requirements. Another objective of the present invention is to offer an injection molding nozzle fitted with such a connection system and with an electric junction of the above kind.

The present invention solves this problem by means of a connection system implementing an electric junction between a heater mounted on a substrate, in particular an injection molding nozzle heater, on one hand, and on the other hand a hookup conductor linked to an electric power source, said connection system comprising a hookup body. In the present invention, said hookup body is made of an electrically non-conducting material, preferably a non-conducting ceramic such as aluminum oxide, steatite, zirconium oxide or the like. The said hookup body moreover comprises at least one passage which receives the hookup conductors and which in the specified state terminates in hookup body face opposite the heaters, said hookup body preferably comprising a separate passage for each hookup conductor. Also, in the present invention, the hookup body is affixable to and/or on the substrate in a manner that the hookup bodies inserted through the minimum of one passage in the specified state shall make contact by their free ends with the heater in order to implement the desired electric junction.

Preferably therefore the hookup body is designed so that the free ends of the hookup conductors in the specified state are configured between that hookup body side face which is opposite the heater and this heater. For that purpose the hookup body fitted on that side which in the specified state which is facing the heating surface advantageously comprises at least one recess which is designed in a manner that at least one free hookup conductor end, for instance a bent or otherwise deformed such end, may be received in said recess. By subtending at least one such recess, a flush or geometric locking between the hookup conductor and substrate is reliably assured. Furthermore, the hookup conductors being deformable or geometrically matching at their free ends, the contact area between the hookup conductors and the heater may be enlarged, providing improved electrical contact and more rigid affixation between the hookup conductors and the heater. Again, due to bending or deforming the hookup conductors' free ends, direct mechanical tensions on the electric junction can be precluded.

In addition the present invention offers the further advantage of the option of one separate recess for each segment of a free hookup conductor end. Accordingly the free ends of the hookup conductors are mutually electrically insulated from each other without requiring further steps for that purpose.

In a further embodiment mode of the present invention, the minimum of one recess preferably is designed in a manner that the minimum of one free end of the hookup conductor in the specified state shall be held frictionally and/or in geometrically locking manner in said recess allow predetermined orientation and mounting of the said free end in said recess.

Preferably the minimum of one recess is shaped like a groove to receive one free hookup conductor end.

Also, the minimum of one recess may comprise a portion designed in a way to match the surface of that substrate to which the hookup conductor shall be affixed in the specified state. If for instance the substrate is a cross-sectionally circular feed pipe, said portion illustratively may be triangular, or trapezoidal or round, as a result of which at least several contact lines are subtended between the hookup body, allowing improved mutual positioning of hookup body and substrate.

The connection system may comprise a retention means designed for the affixation of the hookup body to the substrate. To allow detachable affixation of hookup body to substrate, said retention means may be in the form of a clamp or a snap-in element. Alternatively the retention means may comprise metallic elements which are affixed to the hookup body and can be welded to the substrate. Moreover the hookup body and the substrate also may be bonded to each other.

The present invention also relates to a hot runner nozzle fitted with a connection system of the above described kind.

Lastly the present invention also relates to an electric junction between a heater, in particular an injection molding nozzle heater, and a hookup conductor linked to an electric power source, with a connection system of the present invention, hookup conductors being inserted through the hookup body's passage(s); the hookup conductors being bent or deformed at a predetermined distance from their ends inserted through the passage(s); the hookup conductor ends being configured in the recess(es) provided for them; the hookup conductor ends contacting heater contact pads and the hookup body being affixed to the substrate.

Advantageously the surfaces of the hookup conductor ends and/or the surfaces of the contact pads are fitted with an electrically conducting paste which can be made to melt by a heat treatment procedure to attain permanent electric contacting.

The hookup conductor ends advantageously may be pressed flat to attain increased contact area and commensurately improved electric junction and better affixation. The shape of the contact surface of the hookup conductor ends also may be matched to that of the hookup pads for instance in the event of uneven hookup pad surfaces.

In the present invention, the hookup body may be adhesively affixed to the substrate. Alternatively the hookup body also is affixable to the substrate using a retention means of the above described kind or in other ways.

Lastly the hookup body edges adjoining the substrate may be sealed off using an appropriate sealant to shield the electric junction against humidity.

BRIEF DESCRIPTION OF THE DRAWINGS

Various illustrative embodiment modes of the connection system of the present invention are elucidated below in relation to the appended drawings.

Identical reference numerals apply below to identical or analogous components.

DETAILED DESCRIPTION OF THE INVENTION

Figure 1:
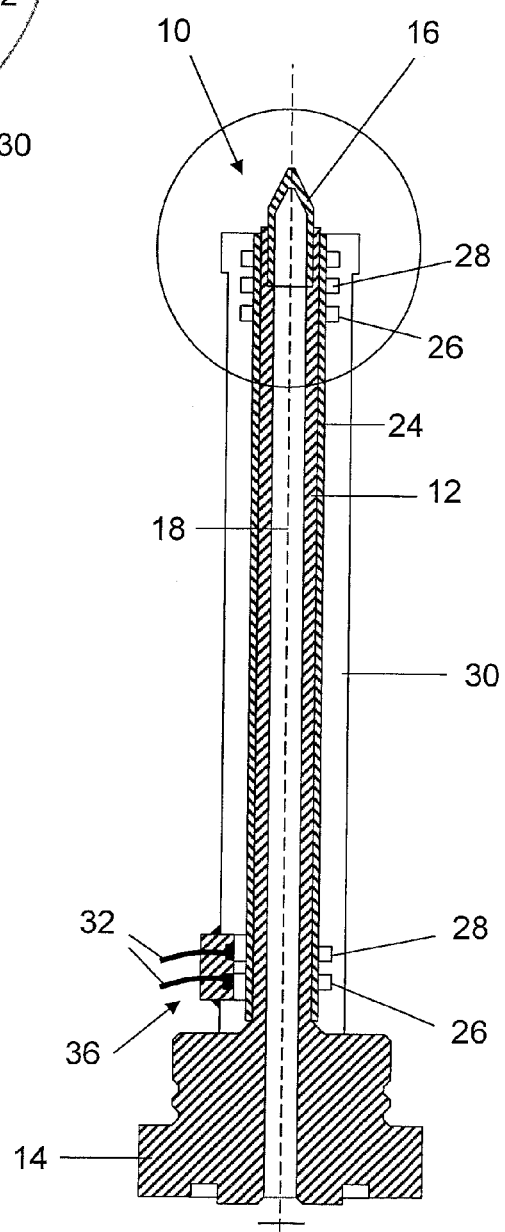
FIG. 1 is a schematic sectional view of a hot runner nozzle fitted with a flat cable heating unit.

The hot runner nozzle 10 shown in FIG. 1 comprises—as part of a thermoplastic processing injection molding equipment—comprises an omitted housing to affix it to a manifold, also omitted, said housing receiving a generally cylindrical feed pipe 12. A terminal base 14, or flange, terminates flush with the housing and rests in sealing manner against the manifold. A nozzle tip 16 is inserted into the axially running feed pipe 12 at latter's end, for instance being screwed into it and extends the flow duct 18 subtended in the feed pipe 12 as far as the omitted plane of a mold nest (also omitted). This muzzle tip 16 may operate in the same way as above if being integral with the feed pipe 12.

A heater 22 is mounted on the circumference of the wall 20 of the steel feed pipe 12. Said heater is designed as a flat heating cable and is fitted with an insulating layer in the form of a ceramic dielectric layer 24 directly applied on said metal, further with a heating layer 26 optionally comprising meandering heat conducting tracks 28, also with an outer sheath 30 externally covering the tracks 28 and insulating them electrically. The heat conducting tracks 28 may assume arbitrary geometries and, depending on the power required, may be deposited in different distributions and arrays on the dielectric sheath 24. This design allows attaining a particular defined temperature distribution within the feed pipe 12.

Figure 3:
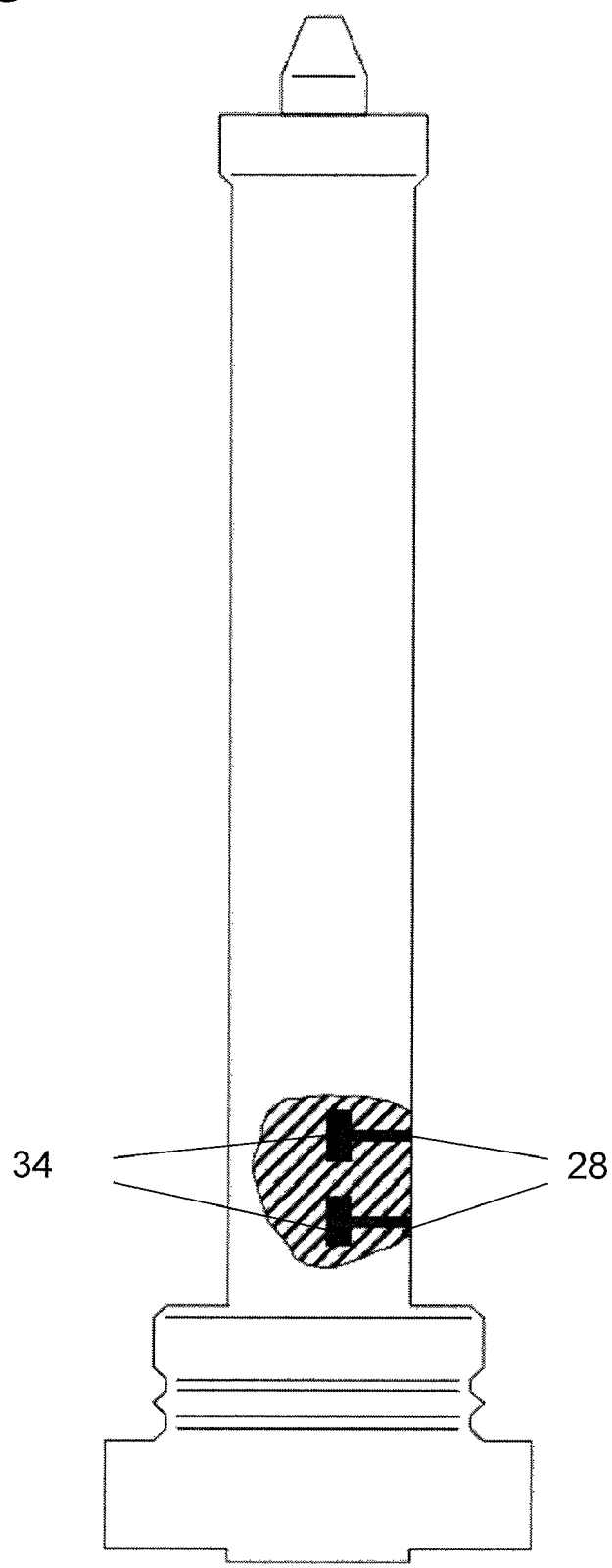
FIG. 3 is a sectional view of the hot runner nozzle of FIG. 1 rotated by 90°, showing terminals pads of the flat cable heater.

To generate an electric junction between the heater 22 and the hookup conductors 32 linked to an omitted power source, a connection system 36 of the present invention is configured on the terminal pads 34 shown in FIG. 3 and guides the hookup conductors 32 to said terminal pads 34 with which they are joined electrically. The connection system 36 passes through an appropriate recess in the sheath 30 and runs as far as the terminal pads 34. Various embodiment modes of the connection system 36 are elucidated below in relation to FIGS. 4 through 9.

Figure 4:
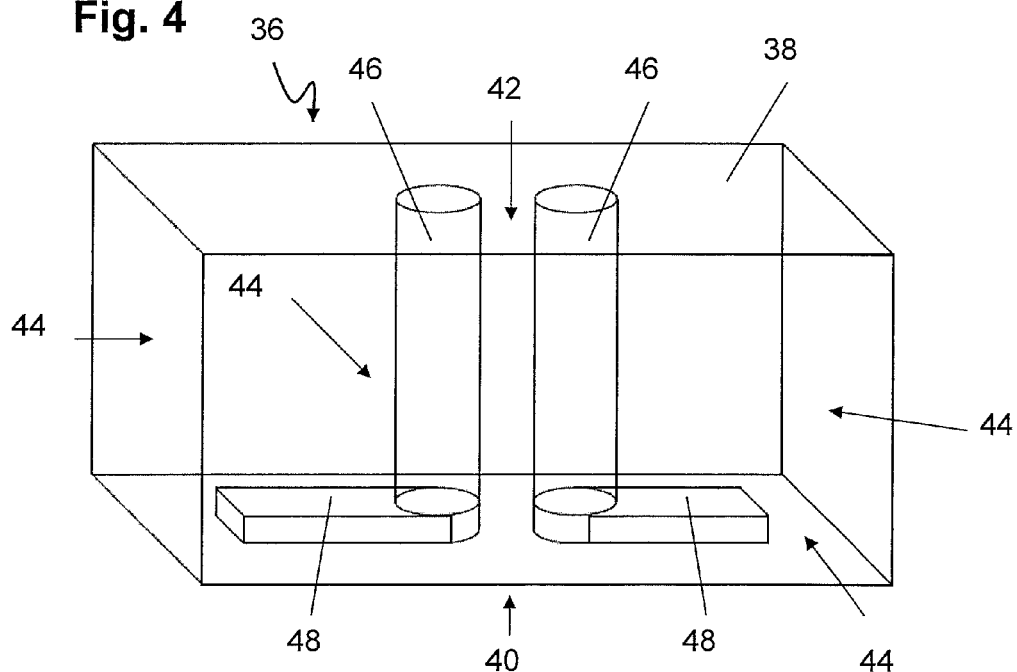
FIG. 4 shows an embodiment mode of a hookup body of a connection system of the present invention.

FIG. 4 is a perspective view of a first embodiment mode of a hookup body 38 of a first embodiment mode of a connection system 36 of the invention, where the hookup body 38 is represented being transparent in the form of wire model. The structure 38 of FIG. 4 illustratively may be used for hot runner nozzles 10 comprising a cross-sectionally rectangular feed pipe 12 and hence also plane side faces. The hookup body 38 is parallelipipedic and made of an electrically non-conducting material, in particular a non-conducting ceramic such as an aluminum oxide, steatite or zirconium oxide. The hookup body 38 comprises a lower side face 40 which—in the present invention—points to the terminal pads 34 of the heater 22, further an upper side face 42 pointing to the lower side face 40, also four further side faces 44 joining the lower side face 40 to the upper side face 42.

Two mutually parallel passages 46 are configured between the lower and upper side faces 40 and 42 respectively which in their specified state receive the hookup conductors 32. Also groove-shaped recesses 48 are present at the lower side faces 40 each communicating with one of the passages 46. In their appropriate state, said recesses 48 receive free and bent ends 50 of each hookup conductor 32. The recesses 48 are configured to be spaced from each other and to be of such size that in their appropriate configuration each shall be configured above one of the terminal pads 34.

Figure 5:
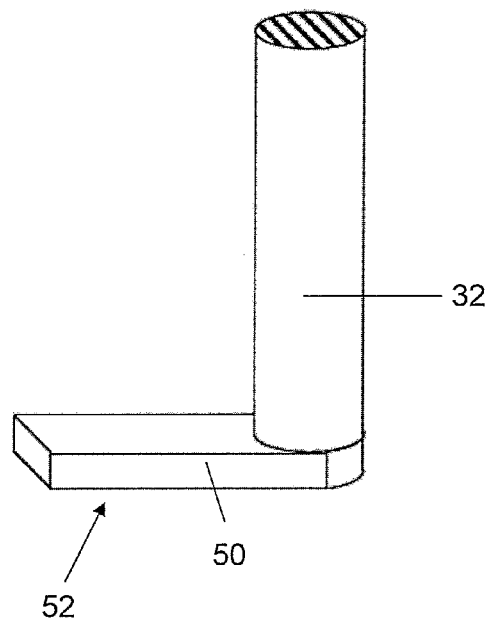
FIG. 5 is a view of a hookup conductor used in the connection system of FIG. 4.

FIG. 5 is a perspective view of a hookup conductor 32 when configured in the hookup body 38 shown in FIG. 4. As shown in FIG. 5, the free segment 50 of the hookup conductor 32 bent around and pressed into flatness, resulting in a substantially plane contact surface 52 that, in the specified state, touches the top side of one of the terminal pads 34. Illustratively the contact surface 52 of the free end segment 50 of the hookup conductors 32 and/or the surfaces of the terminal pads 34 receive an electrically conducting paste molten on them in a thermal treatment procedure to attain permanent electrical contact.

In order to electrically connect the hookup conductors 32 with the terminal pads 34, the hookup conductors 32 are made to pass from the upper side face 42 of the hookup body 38 through the passages 46 to the lower side face 40 and then are bent and pressed flat and lastly will be configured in the recesses 48. Next the hookup body 38 is deposited on the terminal pads 34 of the heater 22 mounted on the plane side faces of the feed pipe 12, and thereupon the conducting paste applied to the free end segments 50 of the hookup conductors 32 and/or to the surfaces of the terminal pads 34 is made to melt by a heat treatment stage to attain permanent electric contact between the hookup conductors 32 and the terminal pads 34.

Figure 6:
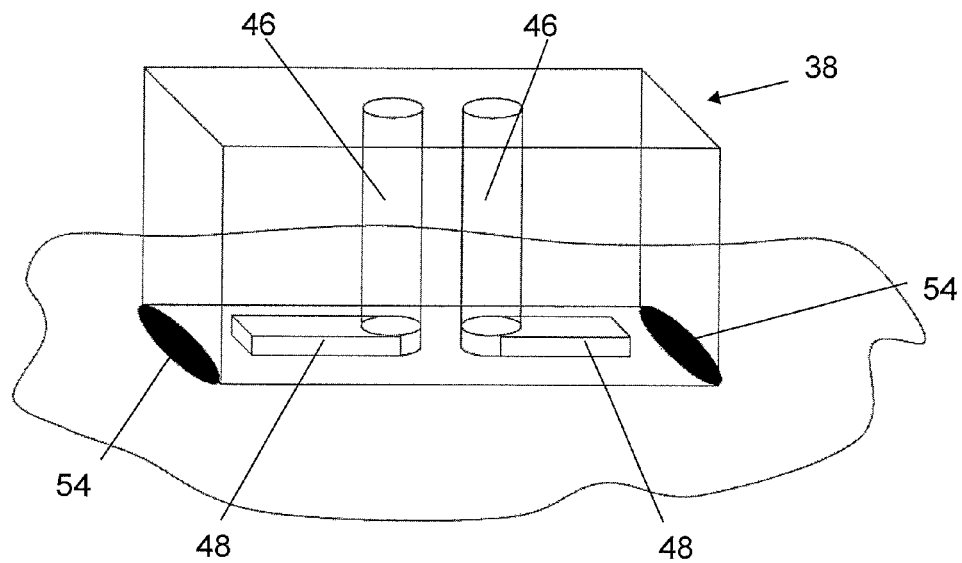
FIG. 6 is a perspective view of the hookup body of FIG. 4 when affixed to the hot runner nozzle.

In order to affix the hookup body 38 shown in FIG. 4 to the hot runner nozzle 10, said body illustratively may be bonded using for instance a ceramic glue or the like to the hot runner nozzle 10 as illustratively shown in FIG. 6 by the bonds 54.

Figure 7:
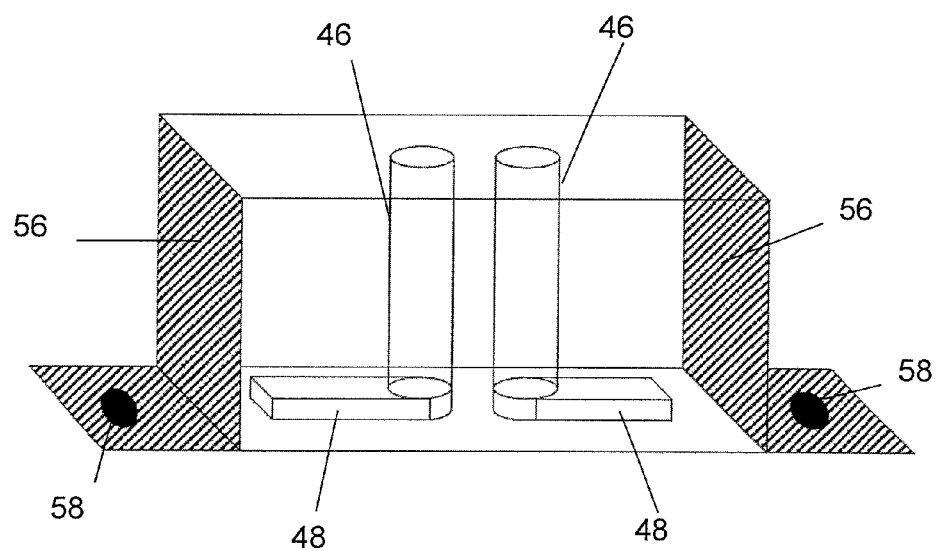
FIG. 7 is a perspective view of the hookup body of FIG. 4 in its affixed state.

Alternatively a retention system in the form of metal angled elements 56 may be mounted on the side faces 44 of the hookup body 38, said elements 56 optionally being welded to a metallic substrate of the hot runner nozzle 10 as indicated by the welding spots 58 in FIG. 7. The angle elements 56 may be bonded or soldered/welded to the side faces 44 of the connection structure 38.

Alternatively said retention system also may be a clamp or a snap-in element to detachably affix the connection structure 38 to a substrate of the hot runner nozzle 10, such a variation however not being detailed herein. In such a case the free end segments 50 of the hookup conductors 32 shall be pressed against the connecting pads 34 of the heater 22.

Also, the mutually contacting surfaces of the connection structure 38 and the substrate of the hot runner nozzle 10 may be appropriately sealed to preclude humidity penetration, this design again not being discussed further herein.

Figure 2:
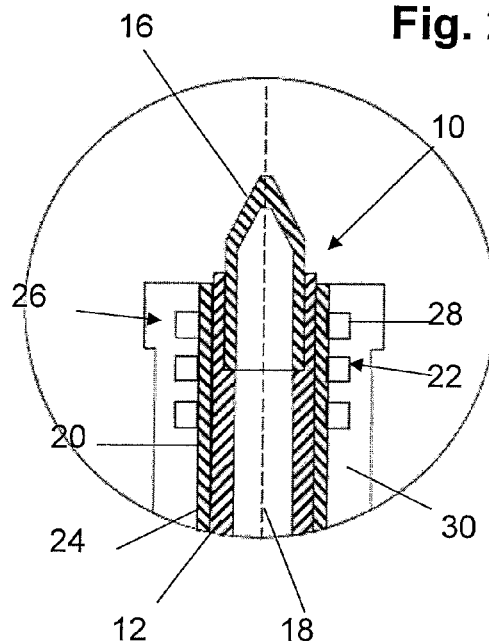
FIG. 2 is an enlarged view of the circular cutaway of FIG. 1.

As regards the connection systems 36 shown in FIGS. 4 through 7, the required electric contact between the heater 22 and the hookup conductor 32 linked to the power source is implemented in reliable manner. Furthermore the connection systems 36 offer tensile relief adequate to the mechanical tensile forces encountered between the connection pads 34 and the hookup conductors 32. Again the connection systems 36 provide the necessary inward and outward electrical insulation. Lastly the connection systems 36 are made compact to allow miniaturizing the injection molding nozzle 10, this feature being especially significant regarding the hot runner nozzle 10 shown in FIGS. 1 and 2 which is already fitted with a thick film heater allowing miniaturization.

Figure 8:
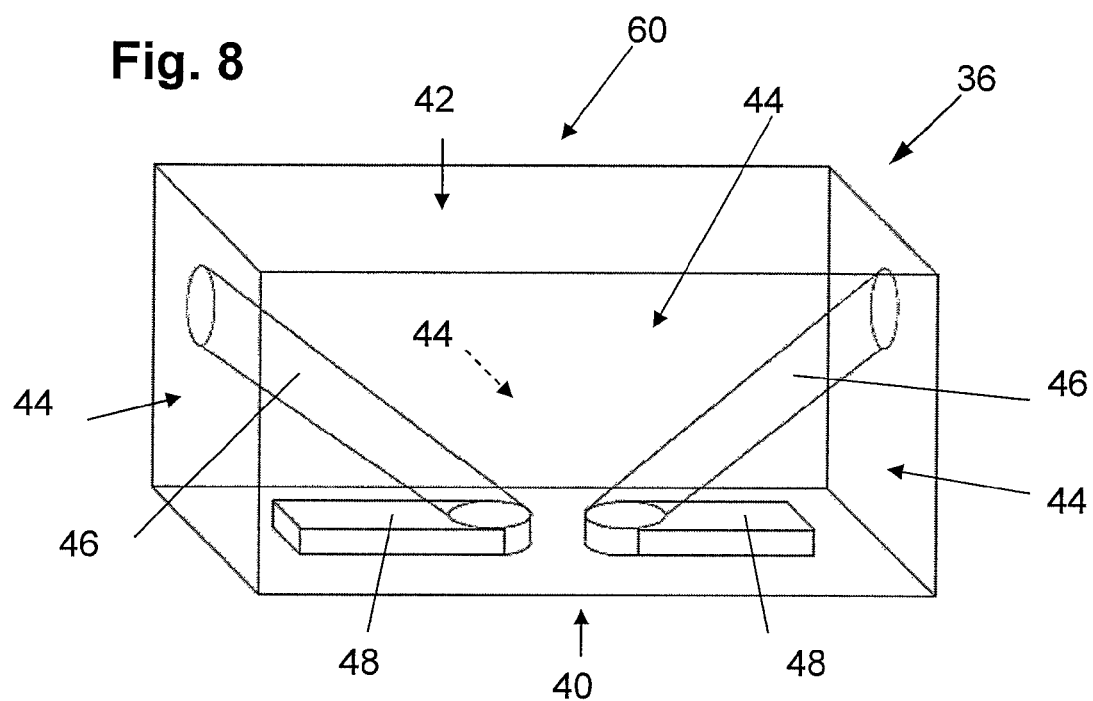
FIG. 8 shows an alternative embodiment mode of a hookup body of a connection system of the present invention.

FIG. 8 shows another embodiment mode of hookup body 60 of a connection system 36 of the present invention. The hookup body 60 differs from the hookup body 38 of FIG. 4 in that the passages 46 are not perpendicular to the lower side face 40 and upper side face 42 but instead run obliquely between two mutually opposite side faces 44 and to the lower side face 40. Therefore the hookup conductors 32 are guided laterally out of the hookup body 60, and moreover, depending on the design of the hot runner nozzle 10, further compactness is attained while simultaneously attaining the advantages of the connection system 36 of the present invention.

Alternatively both passages 46 may run parallel to each other and in that design they will run between the same side face 44 and the lower side face 40. The terminal pads 34 of the heater 22 accordingly should be configured parallel to one another.

Figure 9:
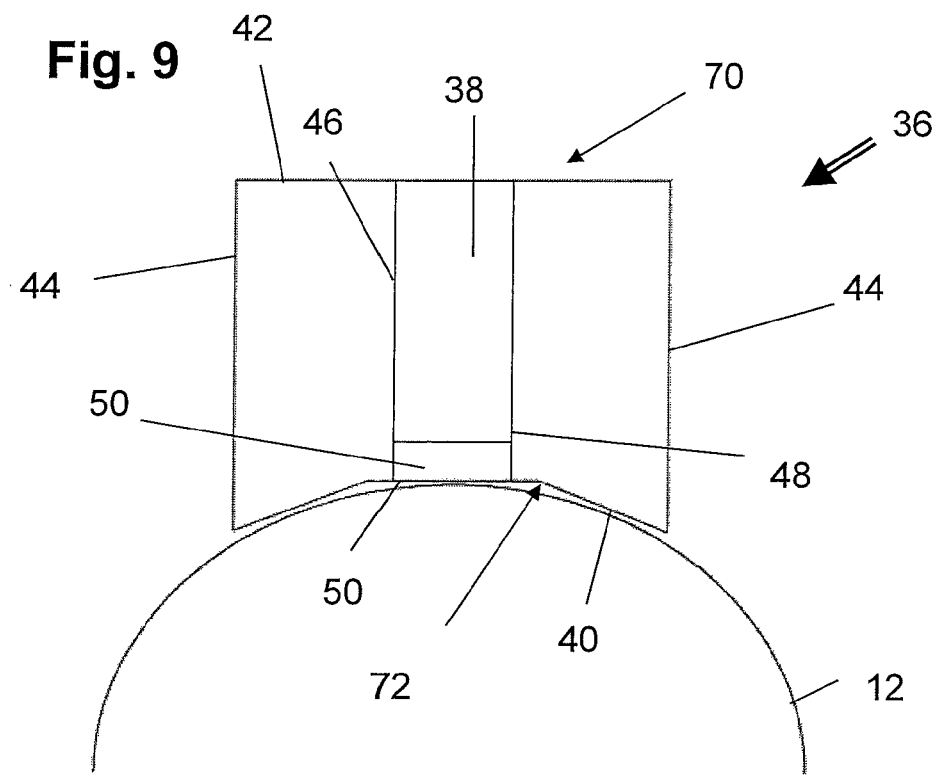
FIG. 9 is another alternative embodiment mode of a hookup body of a connection system of the present invention.

FIG. 9 shows a further embodiment mode of a hookup body 70 of a connection system 36 of the present invention. Said hookup body 70 differs substantially from the previously described one in that the lower side face 40 is fitted with a cross-sectionally trapezoidal recess or hollow 72. The purpose of such a trapezoidal design is to match the lower side face 40 of the hookup body 70 to a round substrate surface of a hot runner nozzle 10 (which is shown cross-sectionally in this instance) to assure affixing, as well as possible, said connection system to the hot runner nozzle 10.

In a further (omitted) design, the lower side face 40 of the hookup body 70 may be matched to the surface of the feed pipe 12 by making said face 40 cylindrical. At the same time the free end segments 50 of the hookup conductors 32 may be shaped commensurately, thereby always attaining the best possible electrical contact.

Figure 10:
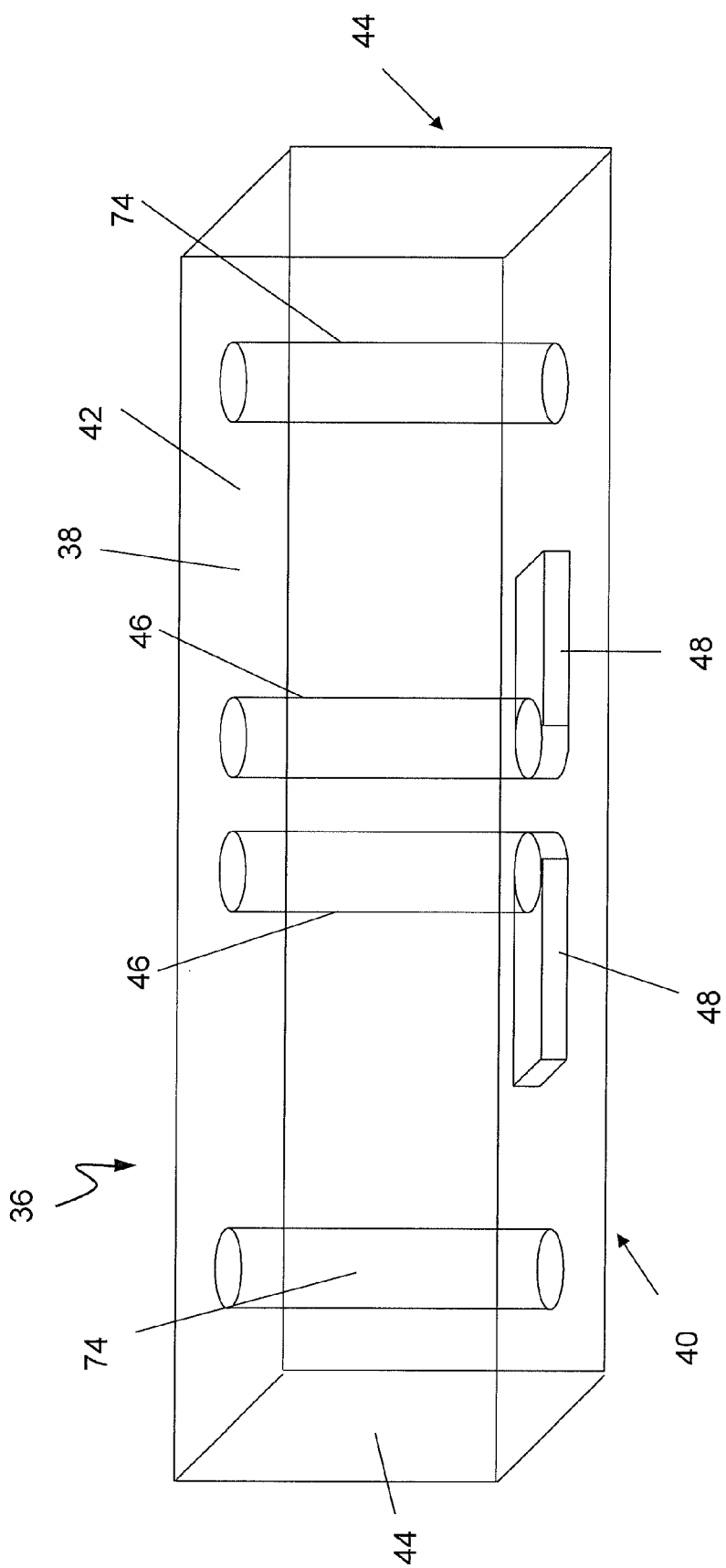
FIG. 10 shows yet another embodiment mode of a hookup body.

FIG. 10 shows a further embodiment mode of a connection system 36. The hookup body 38 in this instance substantially corresponds to the embodiment mode of FIG. 4. Said hookup body merely runs farther on each side of the recesses 48 and comprises further passages (boreholes) 74. As a result, the hookup body 38 also may be firmly affixed—absent glue bonds 54 or angle elements 56—to the feed pipe 12. Each of the additional boreholes 74 receives an omitted pin which is welded, for instance electrically, perpendicularly to the surface of feed pipe 12. The hookup body 38 is plugged as a hookup head onto said pins which either are inserted frictionally into the boreholes 74 or are bent by their projecting ends onto the surface 42 of said structure 38. Alternatively or in complementing manner, the pins also may be fitted with heads which, like rivets, shall be pressed flat.

The boreholes 74 also may be fitted as grooves into the side faces 44.

It is understood that further modifications of and changes in the connection system of the present invention may be introduced without thereby transcending the scope of the present invention which is defined by the appended claims.

LIST OF REFERENCES

10 hot runner nozzle
12 feed pipe
14 base
16 nozzle tip
18 flow duct
20 wall
22 heater
24 dielectric layer
26 heating layer
28 heat heating track
30 sheath
32 hookup conductors
34 terminal pads
36 connection system
38 hookup body
40 lower side face
42 upper side face
44 side faces
46 passages
48 recesses
50 free end segments
52 contact surface 54 bonding affixations
56 angle elements
58 weld spots
60 hookup body
70 hookup body
72 recess

The invention claimed is:

1. A connection system (36) electrically linking a heater (22) for a hot runner nozzle (10) to at least one hookup conductor (32) linked to a power source, the heater (22) is mounted on a substrate, said connection system (36) comprising a hookup body (38; 60; 70)
which is made of an electrically non-conducting material,
which has four side faces (44), an upper side face (42) and a lower side face (40), and
which has at least one passage (46) designed to receive the at least one hookup conductor (32),
in a specified state of the connection system, the lower side face (40) of the hookup body (38, 60, 70) is facing the heater (22); and
in the specified state, the hookup conductor (32) is terminated in said lower side face (40) of the hookup body (38; 60; 70) facing the heater (22),
the hookup body (38; 60; 70) is affixable to or on said substrate so that, in the specified state, the at least one hookup conductor (32) passing through the at least one passage (46) shall make contact by their free ends with the heater (22),
wherein the lower side face (40) of the hookup body (38; 60; 70) facing the heater (22) is fitted with at least one recess (48) which is designed to receive one bent free end segment of a hookup conductor (32).

2. Connection system (36) as claimed in claim 1, characterized in that the hookup body (38; 60; 70) is fitted with a separate passage (46) for each hookup conductor (32).

3. Connection system (36) as claimed in claim 1, characterized in that the hookup bodies (38; 60; 70) are designed in a manner that in the specified state the hookup conductors (32) are configured between that side face (40) of said hookup body (38; 60; 70) which points to the heater (22) and this heater.

4. Connection system (36) as claimed in claim 3, characterized in that a separate recess (48, 72) is used for each free end segment of a hookup conductor (32).

5. Connection system (36) as claimed in claim 3, characterized in that the minimum of one recess (48, 72) is designed in a manner that at least one free end of the hookup conductor (32) shall be kept in said recess in frictional and/or geometrically interlocking manner.

6. Connection system (36) as claimed in claim 3, characterized in that the minimum of one recess (48) is fitted with a grooved-like segment or the like.

7. Connection system (36) as claimed in claim 3, characterized in that the minimum of one recess (72) is fitted with a portion designed to match the surface of that substrate where the hookup body (70) shall be affixed in the specified state.

8. Connection system (36) as claimed in claim 1, characterized in that the electrically non-conducting material is a ceramic.

9. Connection system (36) as claimed in claim 1, characterized in that said system comprises retention means to affix the hookup body (38; 60; 70) to the substrate.

10. Connection system (36) as claimed in claim 9, characterized in that the retention means is a clamp or snap-in element with which to detachably affix the hookup body (38; 60; 70) to the substrate.

11. Connection system (36) as claimed in claim 9, characterized in that the retention means comprises metallic elements (56) that are affixed to the hookup body (38) and welded to the substrate.

12. Hot runner nozzle (10) fitted with a connection system (36) as defined in claim 1.

13. An electric junction between a heater (22) for a hot runner nozzle (22) and at least one hookup conductor (32) linked to a power source, with a connection system (36) as defined in claim 1, where
hookup conductors (32) are inserted through the passages (46) of the hookup body (38; 60; 70);
free ends (50) of the hookup conductors (32) are bent around and pressed into flatness and touching a top side of terminal pads (34);
the hookup conductors (32) are bent a predetermined distance from the hookup conductor ends inserted through the passages (46);
the hookup conductor ends are mounted in assigned recesses (48; 72);
the hookup conductor ends making contact with terminal pads (34) of the heater (22);
the hookup body (38; 60; 70) is affixed to the substrate; and
a surface of the hookup conductor ends and/or surfaces of the terminal pads (34) of the heater fitted with an electrically conductive paste, which can be fused by a heat treatment procedure into a permanent electric contact.

14. Electric junction as claimed in claim 13, characterized in that the hookup conductor ends may be flattened by pressure to increase the contact area.

15. Electric junction as claimed in claim 13, characterized in that the geometry of the contact surface of the hookup conductor ends can be matched to that of the terminal pads (34).

16. Electric junction as claimed in claim 13, characterized in that the hookup body (38; 60; 70) can be affixed adhesively to the substrate.

17. Electric junction as claimed in claim 13, characterized in that the hookup body (38; 60; 70) can be affixed by a retention means.

18. Electric junction as claimed in claim 13, characterized in that the edges of the hookup body (38; 60; 70) abutting the substrate may be sealed using a sealant.

* * * * *